(No Model.) 2 Sheets—Sheet 1.

J. C. McINTYRE.
CORN SILKING MACHINE.

No. 539,007. Patented May 7, 1895.

Witnesses: Theo. L. Popp, F. Gustav Wilhelm
Inventor: J. C. McIntyre
By Wilhelm Bonner, Attorneys.

(No Model.) 2 Sheets—Sheet 2.
J. C. McINTYRE.
CORN SILKING MACHINE.
No. 539,007. Patented May 7, 1895.
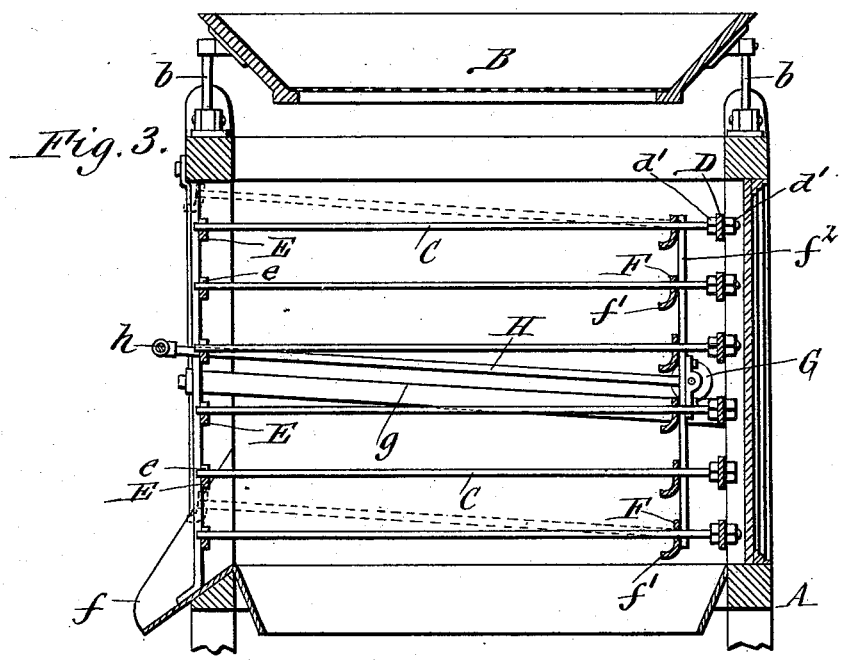
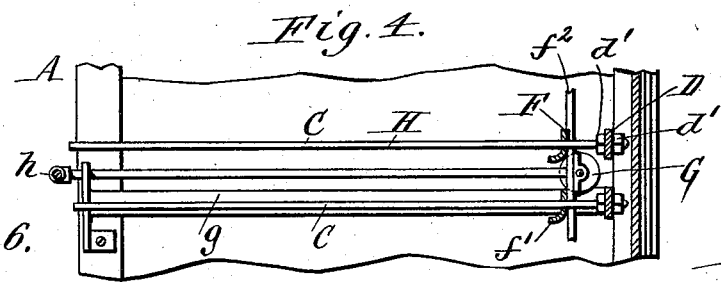
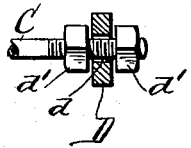
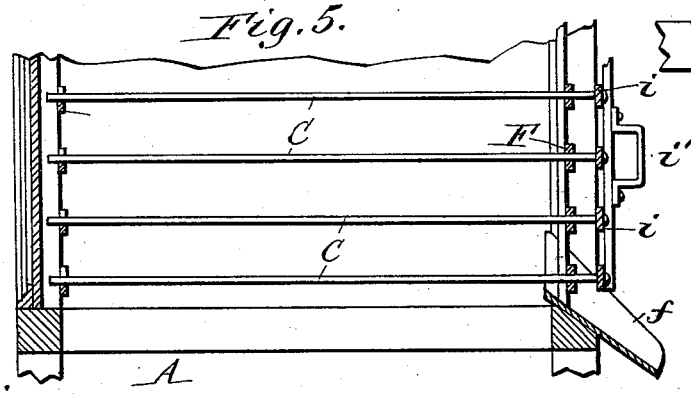
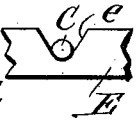
Witnesses:
Theo. L. Popp
F. Gustav Wilhelm
J. C. McIntyre Inventor.
By Wilhelm & Bonner Attorneys.

UNITED STATES PATENT OFFICE.

JOHN C. McINTYRE, OF FARNHAM, NEW YORK, ASSIGNOR, BY MESNE ASSIGNMENTS, TO THE SPRAGUE MANUFACTURING COMPANY, OF SAME PLACE.

CORN-SILKING MACHINE.

SPECIFICATION forming part of Letters Patent No. 539,007, dated May 7, 1895.

Application filed October 11, 1894. Serial No. 525,557. (No model.)

*To all whom it may concern:*

Be it known that I, JOHN C. MCINTYRE, a citizen of the United States, residing at Farnham, in the county of Erie and State of New York, have invented a new and useful Improvement in Corn-Silking Machines, of which the following is a specification.

This invention relates to machines for separating the silk from the kernels of green corn cut from the cob.

The object of my invention is to produce a machine of this character which can be thoroughly and easily cleaned in an expeditious manner.

Figure 1:
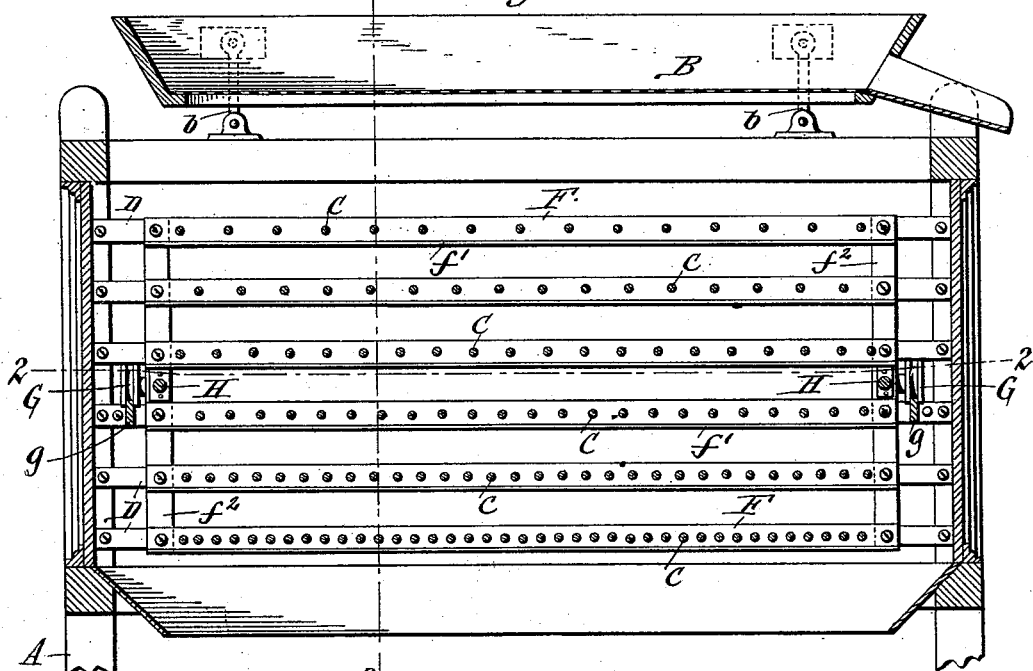
Figure 2:
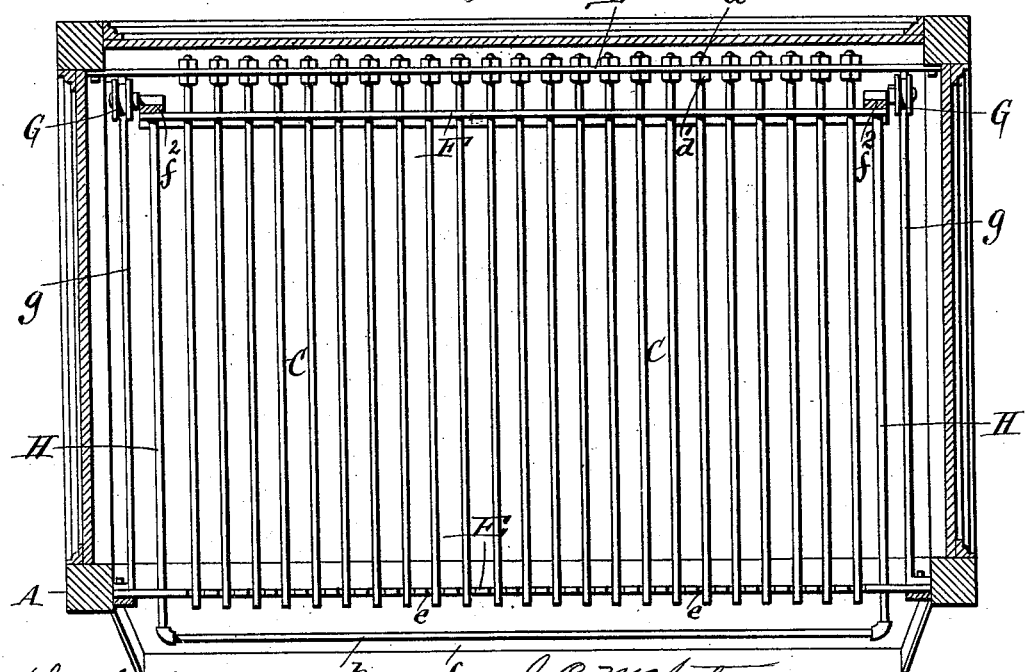

In the accompanying drawings, consisting of two sheets, Figure 1 is a longitudinal sectional elevation of my improved corn-silking machine. Fig. 2 is a horizontal section thereof in line 2 2, Fig. 1. Fig. 3 is a vertical transverse section thereof in line 3 3, Fig. 1. Figs. 4 and 5 are fragmentary transverse sections showing modifications of my improved corn-silking machine. Fig. 6 is a fragmentary sectional view, on an enlarged scale, showing the manner of supporting one end of the separating-rods. Fig. 7 is a fragmentary elevation, on an enlarged scale, showing the manner of supporting the opposite ends of the separating-rods.

Like letters of reference refer to like parts in the several figures.

A represents the main frame of the machine which is open on its front side and on its top and bottom and preferably closed at its ends and on its rear side.

B represents a horizontal shaking sieve or screen which is adapted to separate the broken cobs and other large particles from the silks and kernels of corn. This screen is mounted over the top of the frame by means of links $b$ and has a reciprocating motion imparted to it by any suitable mechanism. The silk and kernels of corn pass through the meshes of the shaking sieve while the broken portions of cobs which are larger than the meshes of the sieve pass over the tail of the sieve.

C represents a number of horizontal separating rods or riddles arranged underneath the screen and adapted to separate the silk from the corn. These rods extend across the frame and are arranged in horizontal rows one above the other, forming a screen or comb through which the silk and corn fall after passing through the shaking sieve. Owing to the stringy nature of the silk it is caught by the separating rods while kernels of corn continue their descent and drop through the rows of separating rods into a receptacle or, if desired, into another shaking sieve arranged below the rods. The separating rods of the several rows are preferably arranged progressively closer together from the uppermost to the lowermost row, as shown in Fig. 1, so as to insure the interception of the greatest possible amount of silk. The rear ends of the separating rods in each row are loosely arranged in openings $d$ formed in a longitudinal connecting bar D, and the separating rods are confined in said openings by screw nuts $d'$ applied to the rods on opposite sides of the connecting bar. The ends of the connecting bars of the several rows of separating rods are secured to the main frame.

E represents supporting bars secured lengthwise to the front portion of the frame and supporting the front ends of the separating rods, one of these supporting bars being arranged underneath the front ends of each row of rods. Each of these supporting bars is provided in its upper edge with a series of notches or seats $e$ in which the front portions of the separating rods rest loosely and whereby the same are held at the proper distance apart.

F represents movable cleaner bars, whereby the silk which collects upon the separating rods is stripped from the latter. One of these cleaner bars is mounted on each row of separating rods preferably by passing the rods through a row of openings in the cleaner bar whereby the latter is free to slide on the separating rods. When the machine is in operation, the cleaner bars are shifted to the rear portions of the rods, in front of the rear supporting bars so as to be out of the way. When a quantity of silk has accumulated on the rods, the cleaner bars are drawn forwardly to the front ends of the rods whereby the silk is stripped from the rods, the detached silk being preferably discharged upon a chute $f$ which conducts the same into a receptacle; or if desired, the silk may simply be discharged on the floor. A longitudinal flange or ledge is formed on each cleaner bar below the separating rods which flange is adapted to catch any particles of silk that may drop from the rods during the stripping or cleaning operation, thereby preventing any silk from falling past the rods with the corn. The ends of the several cleaner bars are connected by vertical bars $f^2$ so that all of the cleaner bars are moved simultaneously. The forward movement of the cleaner bars is arrested when they reach the front ends of the separating rods by means of the vertical connecting bars $f^2$ which are arranged to strike the front supporting bars E for this purpose, thereby preventing the withdrawal of the cleaner bars from the front ends of the separating rods.

In order to allow the cleaner bars to move forwardly beyond the front supporting bars, for the purpose of entirely stripping the silk from the separating rods, the cleaner bars and the front ends of the separating rods are arranged to move upward to permit the cleaner bars to clear the front supporting bars, as shown by dotted lines in Fig. 3. In the construction shown in the drawings, this rising movement of the cleaner bars is effected by rollers G journaled on the vertical connecting bars $f^2$ and running on inclined transverse tracks $g$, secured to the main frame, the heads of said tracks being raised sufficiently to cause the cleaner bars to clear the front supporting bars when drawn to the limit of the forward movement.

As shown in Fig. 6, the rear ends of the supporting rods are fitted in their supports with sufficient looseness to permit the requisite tilting movement thereof.

H represents two transverse draft bars connected at their rear ends to the vertical connecting bars $f^2$ and connected at their front ends by a handle-bar $h$ whereby the cleaner bars are actuated.

If desired, the front supporting bars may be dispensed with as represented in Fig. 4, in which case the front ends of the separating rods are supported entirely by the rollers G and the tracks upon which the rollers run are arranged horizontally.

In the modified construction of my machine illustrated in Fig. 5, the cleaner bars are immovable and the separating rods slide through the cleaner bars for removing the silk therefrom. In this construction the cleaner bars are rigidly secured to the main frame and the front ends of the separating rods are connected by movable connecting bars $i$ having a handle $i'$, whereby the rods are slid in the openings of the stationary cleaner bars.

I claim as my invention—

1. The combination with a supporting frame provided with a horizontal shaking sieve, of a series of separating rods supported in said frame below the sieve and arranged in horizontal rows one below the other, and cleaner bars having openings through which the separating rods pass, substantially as set forth.

2. The combination with the supporting frame provided with a horizontal shaking sieve, of a series of separating bars supported at their ends in said frame below the sieve and arranged in horizontal rows one below the other, the separating rods of the several rows being arranged progressively closer together from the uppermost to the lowermost row and cleaner bars adapted to move lengthwise upon said separating rods, substantially as set forth.

3. The combination with a series of separating rods, of a cleaner bar adapted to slide lengthwise on said rods and provided with a flange or ledge below said rods, substantially as set forth.

4. The combination with the front and rear supporting bars, of a series of separating rods attached at their rear ends to the rear supporting bar and capable of rising at their front ends above the front supporting bar, means for lifting the front ends of the separating rods and a cleaner bar arranged to slide on the separating bars, substantially as set forth.

5. The combination with the rear supporting bar and the front supporting bar, of separating rods loosely connected at their rear ends with the rear supporting bar and resting loosely with their front ends in the notches of the front supporting bar, a cleaner bar arranged to slide upon said separating rods and means for lifting the front ends of said rods, substantially as set forth.

6. The combination with the front and rear supporting bars, of separating rods connected loosely at their rear ends with the rear supporting bar and resting loosely with their front ends upon the front supporting bar, a cleaner bar arranged to slide upon said rods, rollers connected with the cleaner bar, and inclined tracks supporting said rollers, whereby the cleaner bar is raised above the front supporting bar upon being drawn forward, substantially as set forth.

Witness my hand this 15th day of June, 1894.

JOHN C. McINTYRE.

Witnesses:
ELLA R. DEAN,
JNO. J. BONNER.